(12) United States Patent
Holton

(10) Patent No.: US 7,448,590 B1
(45) Date of Patent: Nov. 11, 2008

(54) HURRICANE FLAG MOUNT

(76) Inventor: Frank Holton, 69374 Sisters View Dr., Sisters, OR (US) 97759

( * ) Notice: Subject to any disclaimer, the term of this patent is extended or adjusted under 35 U.S.C. 154(b) by 0 days.

(21) Appl. No.: 11/782,693

(22) Filed: Jul. 25, 2007

(51) Int. Cl.
    *A01K 97/10* (2006.01)
(52) U.S. Cl. .................. 248/534; 116/173; 248/539
(58) Field of Classification Search ............ 248/534, 248/535, 536, 539, 540, 541, 514, 515, 516; 40/591; 116/173
    See application file for complete search history.

(56) References Cited

U.S. PATENT DOCUMENTS

| | | | |
|---|---|---|---|
| 2,093,951 A | 9/1937 | Bosket | |
| 4,582,017 A | 4/1986 | Ostermiller | |
| D335,254 S | 5/1993 | Carter | |
| 5,374,024 A * | 12/1994 | Williams | 248/514 |
| 5,396,915 A * | 3/1995 | Bomar | 135/16 |
| 5,472,166 A * | 12/1995 | Wear | 248/514 |
| 5,520,141 A * | 5/1996 | Lutz | 116/173 |
| 5,588,630 A * | 12/1996 | Chen-Chao | 248/514 |
| 5,732,927 A | 3/1998 | Purpura | |
| 2002/0189525 A1 | 12/2002 | Nathan | |
| 2005/0028722 A1 | 2/2005 | Arntz | |
| 2005/0108909 A1 | 5/2005 | Andersen | |
| 2006/0027725 A1 * | 2/2006 | Lin | 248/534 |
| 2006/0102824 A1 * | 5/2006 | Carnevali | 248/534 |

* cited by examiner

*Primary Examiner*—Ramon O Ramirez
(74) *Attorney, Agent, or Firm*—Lawrence J. Gibney, Jr.

(57) ABSTRACT

This is a versatile flag mounting system, which allows the flagpole bracket and related entities to be secured onto structures such as ladder tubing or railing on a variety of recreational vehicles. This device also allows for rotation of the flag relative to the horizon. The flagpole is secured within this device using a means of securement such as a thumbscrew. This device can also be mounted or secured on a variety of surfaces or structures such as, most flat or round surfaces, homes, corners, fences, and more similarly situated examples.

10 Claims, 6 Drawing Sheets

HURRICANE FLAG MOUNT

BACKGROUND OF THE INVENTION

A. Field of the Invention

This relates to mounting a flagpole securely on a recreational vehicle and being able to rotate the flag to various angles relative to the horizon.

B. Prior Art

There are many prior art references to flagpole holders, and a representative example of this type of device can be found at Arntz, U.S. Publication number 2005/0028722. This is a flag assembly for mounting a flag to the rearview mirror on a motor vehicle. However, this does not allow the flag to rotate but simply mounts the flag. Another example in the prior art is a vehicle flag holder, which is found at Anderson, U.S. Publication number 2005/0108909, which is a flag holder that is placed in the back of a vehicle, using a portion of the vehicle where a hitch would normally be placed. This allows the flag to tilt to a certain angle. However, it only allows the tilting in one particular direction. There is also an alternative embodiment where two flags can be mounted to the back of the vehicle.

Another example can be found at Nathen, U.S. Publication number 2002/0189525, which is a detachable vehicle trailer hitch display flag apparatus. Again, this is placed on the hitch of a vehicle. A bumper flag assembly can be found at Ostermiller, U.S. Publication number 4,582,017. Again, this is in the particular shape of a "1" that can be mounted on the side of a vehicle. However, this does not allow rotation of the flag in various angles relative to the horizon.

BRIEF SUMMARY OF THE INVENTION

This is a flagpole mounting system, which allows a flagpole to be inserted into a flagpole bracket, secured and then rotated to various positions relative to the horizon. This rotation may be important in terms of simple decoration or in terms of particular flag placement. Several embodiments are included to allow an individual to rotate their flag. However, rotation of the flag and securing the flag requires two main elements that form the basic structure of this invention.

It is the object of this device to securely mount a flag to a portion of a recreational vehicle and allow rotation of that flag relative to the horizon. Although the device was initially designed with recreational vehicles in mind, this device may easily be used with many other structures as well, such as houses, fences, corners and several more similarly situated examples.

DETAILED DESCRIPTION OF THE EMBODIMENTS

NUMBERING REFERENCES

Figure 1:
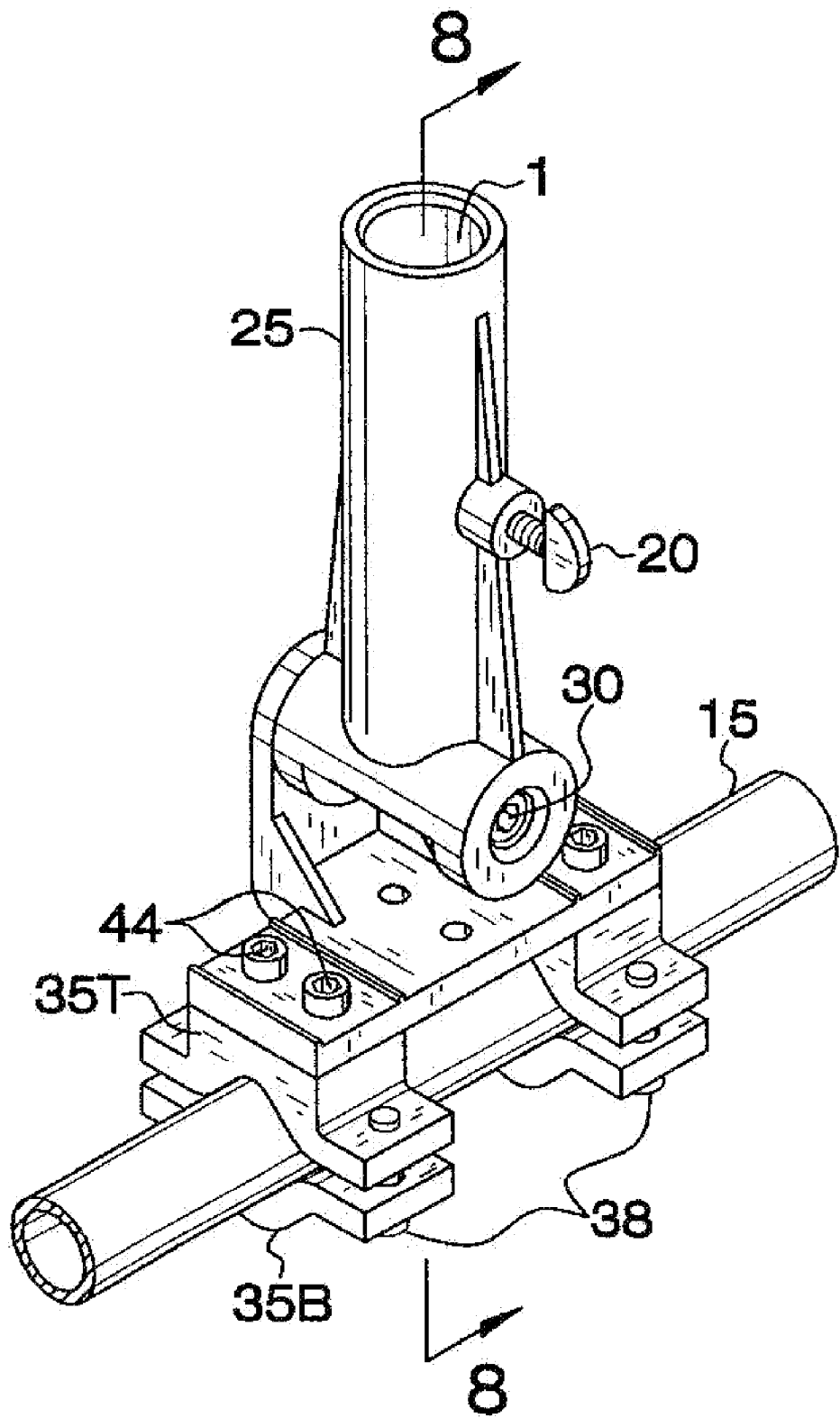
FIG. 1 is an isometric view of the device.

1. Hollow portion of flagpole bracket 25
3. Universal mounting bracket
15. A tubular or round mounting surface
20. Thumb screw for securing a flagpole
25. Flagpole holder bracket
26. Cylindrical portion of flagpole bracket
30. Mounting bolt to secure flagpole bracket to mounting bracket
35T. Top mounting clamp for tubular or round mounting applications
35B. Bottom mounting clamp for tubular or round mounting applications
36L. Interlocking lugs on universal mounting bracket for rotational positioning of flagpole bracket
36H. Holes in flagpole holder bracket to accept interlocking lugs on universal mounting bracket
36P. Positioning post on universal mounting bracket with a tapped or threaded hole to align and secure flagpole bracket
36R. Positioning recess on flagpole holder bracket to accept position post on universal mounting bracket
38. Bolts for securing top mounting clamp to bottom mounting clamp
44. Bolts for securing top mounting clamp to universal mounting bracket
50. Corner mounting bracket for ease of corner mounting applications This is a device to secure a flagpole but to also allow rotation of the flagpole relative to the horizon. It is anticipated that this device will be used on recreational vehicles but this device is well suited for use on other structures as well.

FIRST EMBODIMENT

The flagpole bracket 25 has a hollow center 1 which is used to accept the flagpole to this device. A means to secure the flagpole within the hollow center 1 is provided; a means may include a thumbscrew 20 on the side of the flagpole bracket 25. The thumbscrew 20 fits within a tapped and threaded hole as displayed in FIGS. 1, 2 and 3. The flagpole bracket 25 has a first end and a second end. The hollow portion 1 into which the flagpole is inserted is located at the first end and the second end is secured to the universal mounting bracket 3.

The cylindrical portion 26, which is an integral part of the flagpole bracket 25, is located at the second end. The second end is hollow to accommodate a bolt or screw to secure the flagpole bracket 25 to the universal mounting bracket 3. Holes are provided in the rectangular flat surface of the universal mounting bracket 3 by which a mounting means is used to secure the universal mounting bracket 3 to the top mounting clamps 35T. These mounting clamps may include screws or bolts.

The mounting means for this device will be comprised of two parts: a top mounting clamp 35T and a bottom mounting clamp 35B. Installation openings in the top mounting clamp 35T and the bottom mounting clamp 35B are provided. The universal mounting bracket 3 is secured with bolts 44 to the top mounting clamp 35T and then to the bottom mounting clamp 35B with bolts 38 encompassing and securing to a round or tubular mounting surface 15. It is anticipated that two mounting clamps 35T and 35B will be provided to secure this device. The round mounting surface 15 could be a recreational vehicle ladder or a round surface with diameters, such as one inch through one and one-half inches.

As shown in FIG. 1, the top 35T and bottom 35B mounting clamps will likely be secured together by a plurality of mounting bolts 38; open holes in the bottom clamp 35B are provided and threaded holes in the top clamp 35T are provided. The universal mounting bracket 3 is in the general shape of an "L" with a flat surface, which provides a surface to secure the universal mounting bracket 3 to the top surface of the mounting clamp 35T. The universal mounting bracket has a plurality of open holes into which a mounting means 44 are placed to secure the universal mounting bracket 3 to the top mounting clamp 35T.

On the other portion of the universal mounting bracket 3 are a positioning post 36P and a series of four interlocking lugs 36L which protrude predetermined distances and mate with openings 36R and 36H on mating portions of flagpole bracket 25. This series of interlocking lugs and a centering post allows the flagpole bracket 25 to be rotated then properly centered for positioning and securing relative to the horizon. A tapped and threaded hole located in the center of the positioning post 36P in the universal bracket 3 mates with a mounting bolt 30, which is positioned through the center of the cylindrical portion 26 of flagpole bracket 25.

Figure 2:
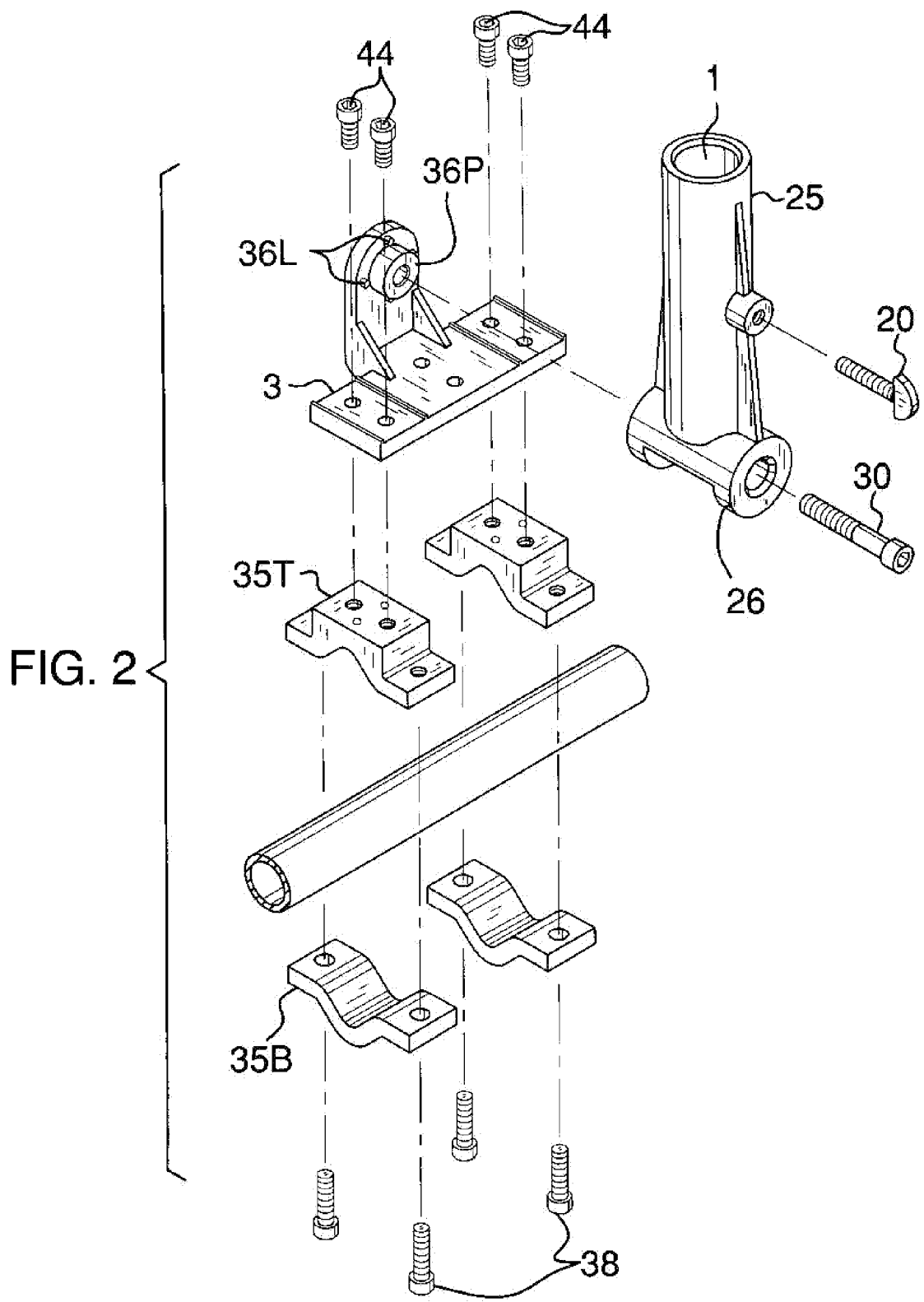
FIG. 2 is an exploded isometric view of the device.
Figure 3:
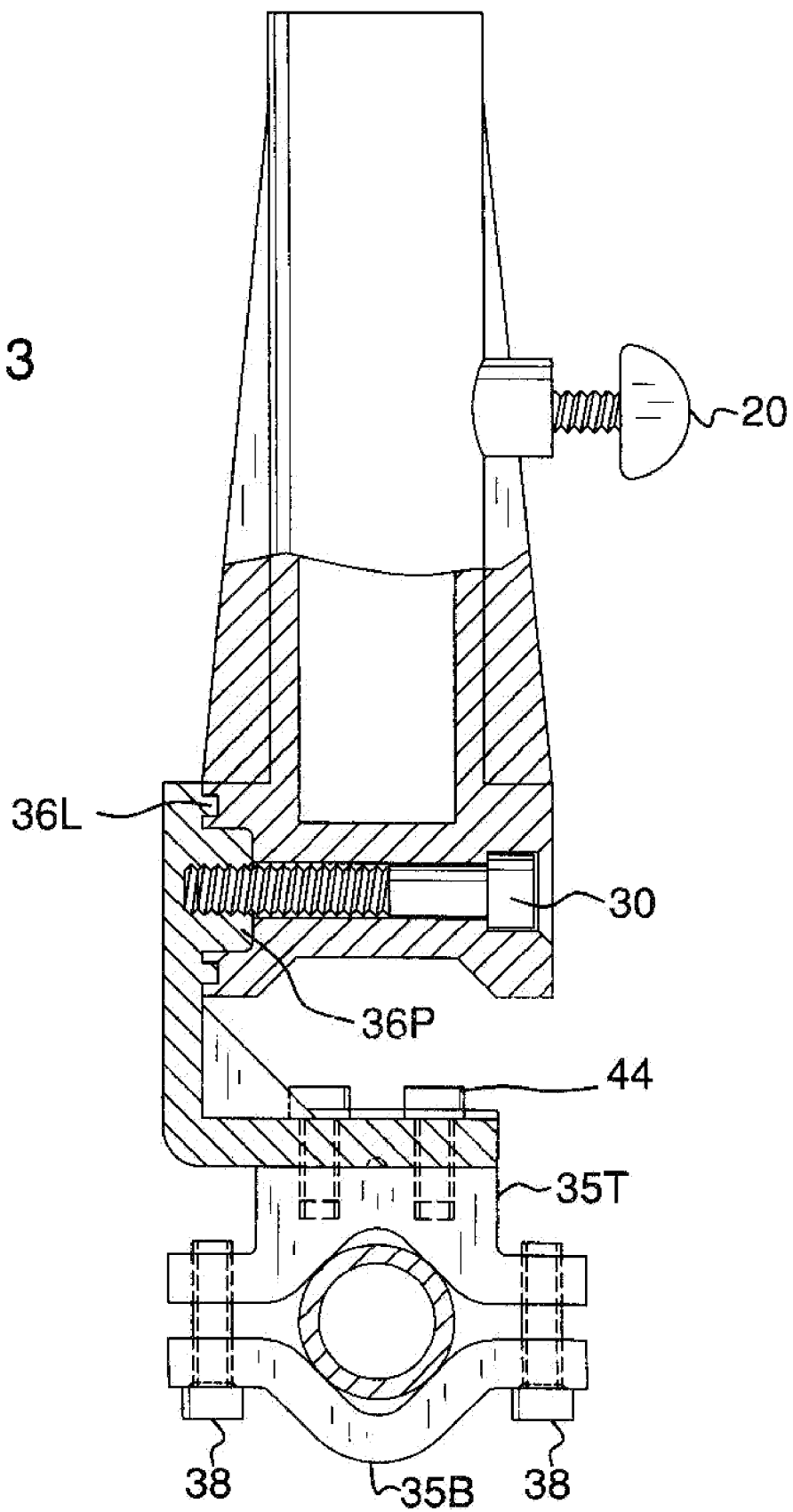
FIG. 3 is a section view according to line 8-8 on FIG. 1.
Figure 4:
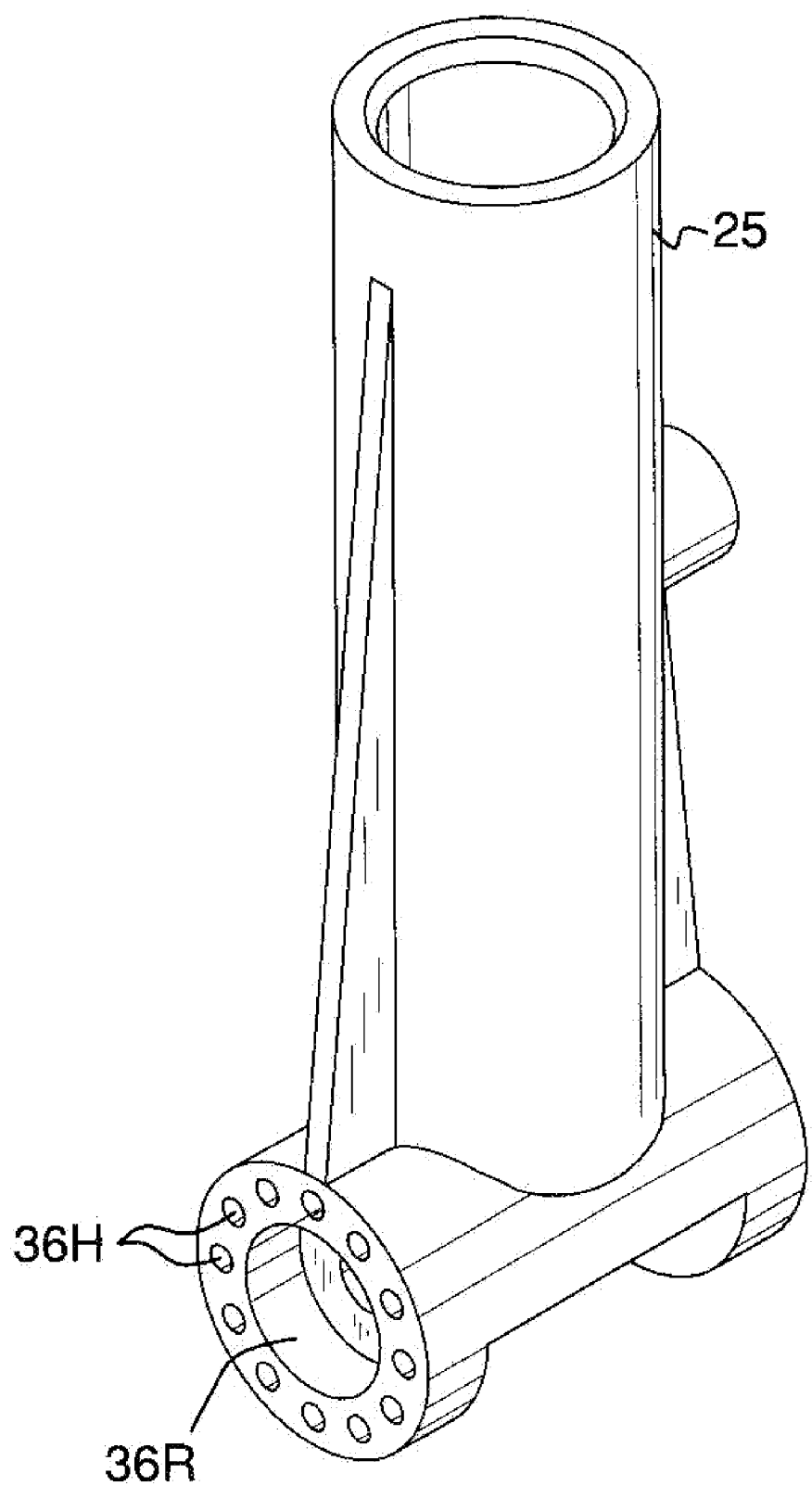
FIG. 4 is an isometric view of the means of rotation.
Figure 5:
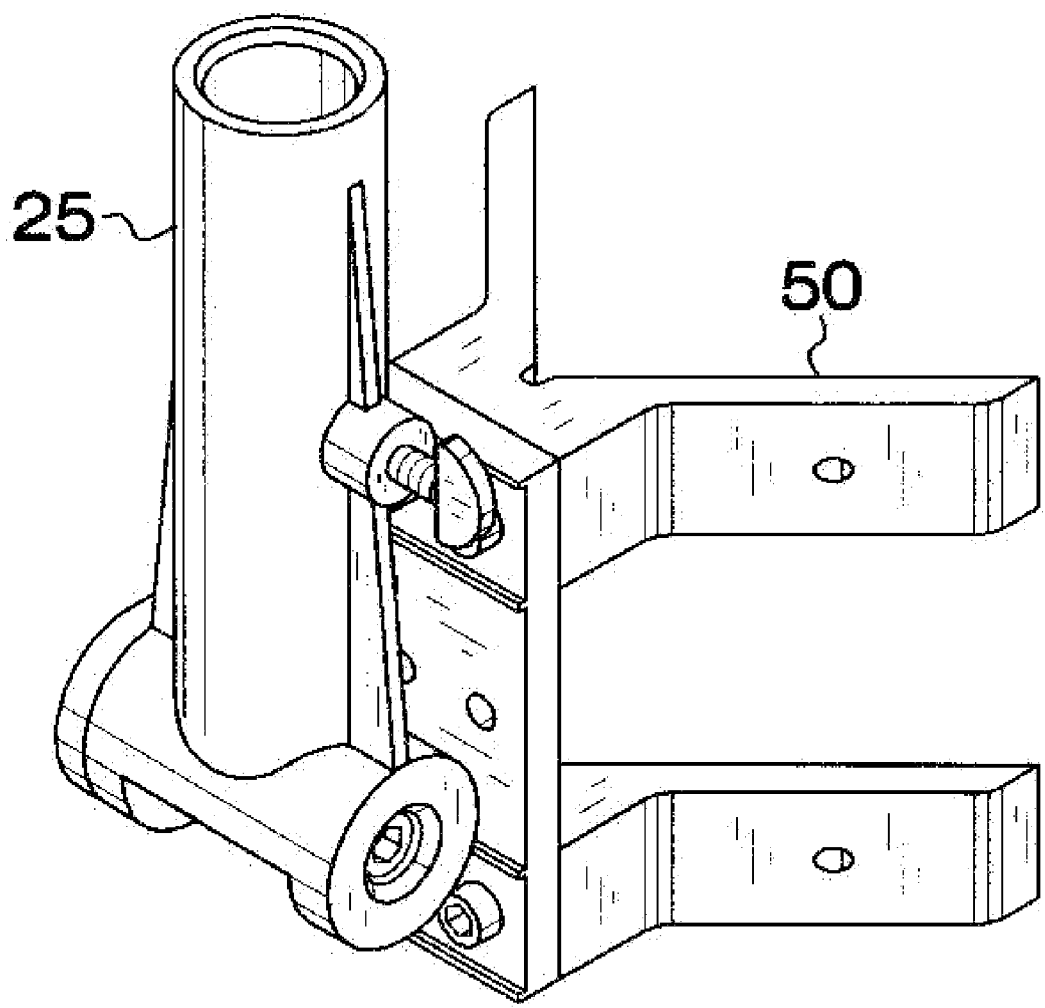
FIG. 5 is an isometric view of the second embodiment.
Figure 6:
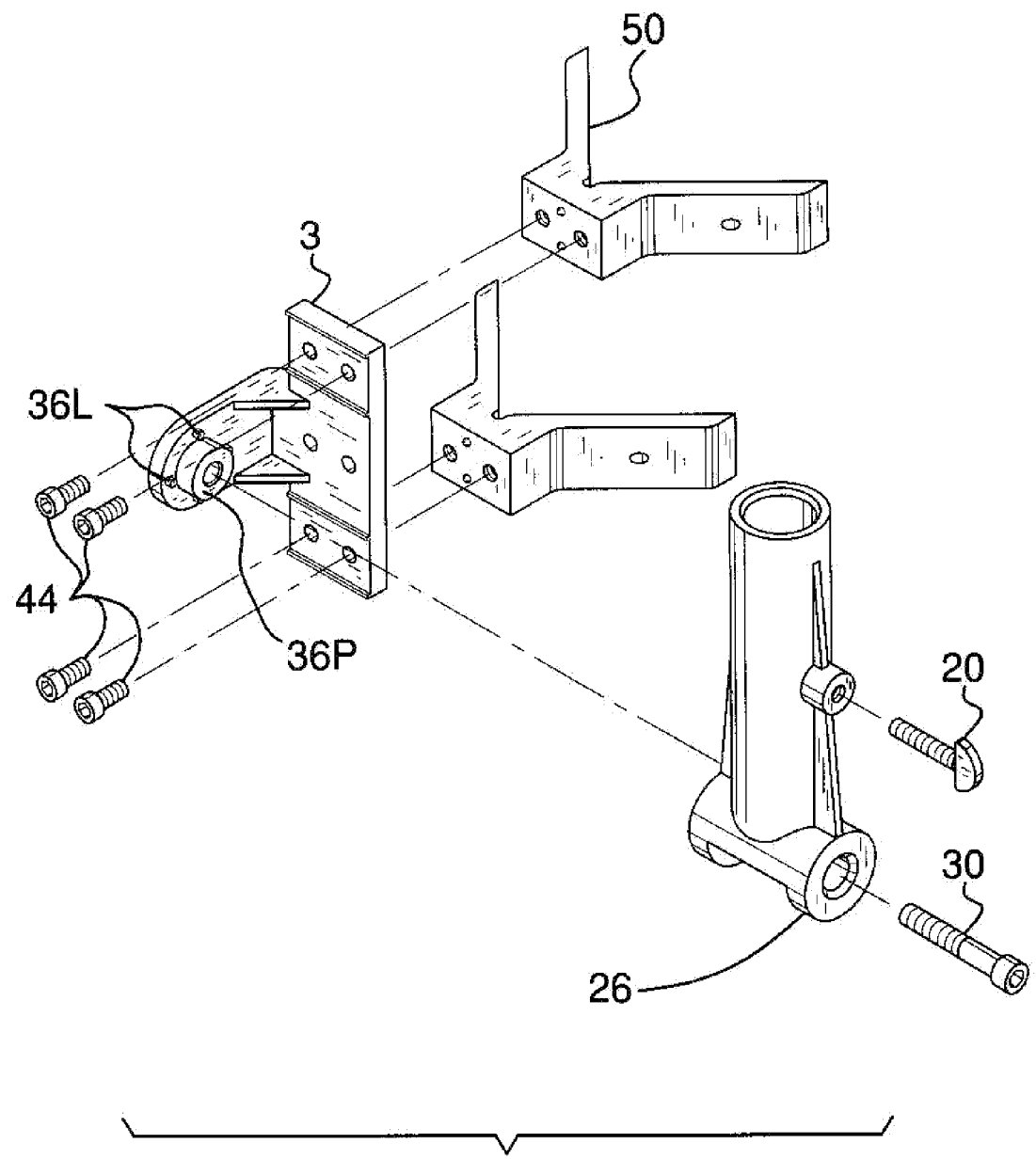
FIG. 6 is an exploded isometric view of the second embodiment.

When the bolt 30 is loosened the flagpole bracket 25 is allowed to rotate and when the bolt is tightened the flagpole bracket 25 remains in place. The flagpole bracket 25 is allowed to rotate relative to the horizon as depicted in FIG. 5. This is accomplished by using the series of interlocking lugs 36L and positioning post 36P as shown in FIGS. 2, 3 and 6, as well as the interlocking holes 36H and positioning recess 36R as shown in FIGS. 3 and 4, by which the flag may be rotated to a variety of positions relative to the horizon.

SECOND EMBODIMENT

Instead of being secured to tubing or a recreational vehicle ladder, the second embodiment allows this device to readily be mounted to the corner of a structure. This is easily accomplished by using the corner mounting bracket 50. The means to mount the corner mounting bracket 50 to the universal mounting bracket 3 is accomplished by using the series of bolts that are placed through holes in the universal mounting bracket 3. The cylindrical portion of the flagpole holder bracket 25 will be mounted to the universal mounting bracket 3 identically as the first embodiment. It is anticipated that two corner mounting brackets 50 will be used with this embodiment.

While the embodiments of the invention have been disclosed, certain modifications may be made by those skilled in the art to modify the invention without departing from the spirit of the invention.

The inventor claims:

1. A flag mount, which is comprised of:
   a. a flagpole bracket;
   wherein the flagpole bracket has a first end and a second end;
   wherein the flagpole bracket is hollow;
   wherein a flagpole is inserted into the hollow opening in the first end;
   wherein a means to secure the flagpole is provided on the flagpole bracket;
   b. a cylindrical member;
   wherein the cylindrical member is an integral part of the flagpole bracket;
   wherein the cylindrical member is hollow to insert a mounting bolt;
   wherein a plurality of positioning holes are provided on one side of the cylindrical member of the flagpole bracket;
   wherein a positioning recess is provided on one side of the cylindrical member of the flagpole bracket;
   wherein the positioning recess provides a means to locate and secure the flagpole bracket to a universal mounting bracket;
   wherein a means to secure the cylindrical member of the flagpole bracket to the universal mounting bracket is provided;
   c. a universal mounting bracket;
   wherein the universal mounting bracket is in the general shape of an "L";
   said "L" shape has a long side and a short side;
   wherein the long side of the universal mounting bracket is a flat surface with holes through which top mounting clamps are secured;
   wherein mounting bolts will be provided;
   wherein the shorter side has four interlocking lugs and a positioning post;
   wherein the center of the positioning post may be a tapped or threaded hole;
   wherein the shorter side is used to align, position and secure the universal mounting bracket to the flagpole bracket;
   d. interlocking lugs;
   wherein a plurality of interlocking lugs are provided on a surface of the universal mounting bracket;
   wherein positioning holes are provided on one side of the cylindrical member to receive interlocking lugs;
   wherein interlocking lugs and holes are provided for the positional placement of the cylindrical member to the universal mounting bracket;
   e. a positioning post;
   wherein a positioning post is provided;
   wherein a positioning post is provided on a surface of the universal mounting bracket;
   wherein a positioning post is provided for positive alignment of the universal mounting bracket to the flagpole bracket;
   wherein a tapped or threaded hole is provided to secure the flagpole bracket with a mounting bolt;
   f. a positioning recess;
   wherein a positioning recess is provided;
   wherein a positioning recess is provided on one side of the cylindrical member of the flagpole bracket;
   wherein a positioning recess is provided on one side of the cylindrical member of the flagpole bracket to receive the positioning post;
   wherein a positioning recess is provided to assure proper alignment of the flagpole bracket to the universal mounting bracket;
   wherein a plurality of positioning holes are provided adjacent to the positioning recess;
   g. mounting clamps;
   wherein a plurality of mounting clamps secure the device to a mounting surface;
   wherein the mounting clamps are further comprised of a top clamp and a bottom clamp;
   wherein openings are provided on the top surface of the top clamp;
   wherein threaded holes are provided on the top surface of the top clamp;
   wherein the top clamp can be bolted to the universal mounting bracket;
   wherein open holes are provided in the bottom clamp;
   wherein the securing means will tighten the space between the top and bottom mounting clamps;
   wherein the top and bottom clamps will be secured to the mounting surface.

2. The device as described in claim 1 wherein the means to secure the flagpole is a thumbscrew.

3. The device as described in claim 1 wherein the means to secure the cylindrical member to the universal mounting bracket is a mounting bolt.

4. The device as described in claim 1 wherein the center of the positioning recess is hollow.

5. The device as described in claim 1 wherein the center of the positioning recess is a tapped and threaded hole.

6. The device as described in claim 1 wherein the mounting surface is tubular.

7. The device as described in claim 1 wherein the mounting surface is an recreational vehicle ladder.

8. A alternate flagpole mounting system which is comprised of:
   a. a flagpole bracket;
   wherein the flagpole bracket has a first end and a second end;
   wherein a flagpole is inserted into an opening in the first end;
   wherein the flagpole bracket is hollow;
   wherein the flagpole is placed in the hollow space of the flagpole bracket;
   wherein a means to secure the flagpole is provided on the flagpole bracket;
   wherein the means to secure is a thumbscrew;
   wherein the second end is a cylindrical member and an integral part of the first end;
   b. a universal mounting bracket;
   wherein the universal mounting bracket is in the general shape of an "L";
   wherein one side of the universal mounting bracket is a flat surface to which top mounting clamps are secured;
   wherein the other side is used to align, position and secure the flagpole bracket to the mounting bracket;
   c. a cylindrical member;
   wherein the cylindrical member is an integral part of the flagpole bracket;
   wherein the cylindrical member is hollow to insert a mounting bolt;
   wherein a plurality of positioning holes are provided on one side of the cylindrical member of the flagpole bracket;
   wherein a positioning recess is provided on one side of the cylindrical member of the flagpole bracket;
   wherein the positioning recess is for positive locating of the flagpole bracket to the universal bracket;
   wherein a mounting bolt to secure the cylindrical member of the flagpole bracket to the universal mounting bracket is provided;
   d. corner mounting bracket;
   wherein the corner mounting bracket has a predetermined shape;
   wherein openings are provided on a top flat surface of the corner mounting bracket;
   wherein threaded holes are provided on the top flat surface of the mounting bracket;
   wherein mounting bolts to secure the corner mounting bracket to the universal mounting bracket are provided;
   wherein a plurality of interlocking lugs are provided on a surface of the universal mounting bracket;
   wherein holes are provided on one side of the cylindrical member to receive interlocking lugs;
   wherein interlocking lugs and holes are provided for secure positioning of a flag relative to the horizon.

9. The device as described in claim 8 wherein the center of the positioning recess is hollow.

10. The device as described in claim 8 wherein the center of the positioning recess is a tapped and threaded hole.

* * * * *